Nov. 26, 1957   C. L. ACKLEY ET AL   2,814,110
PRUNING SAW
Filed Jan. 23, 1956
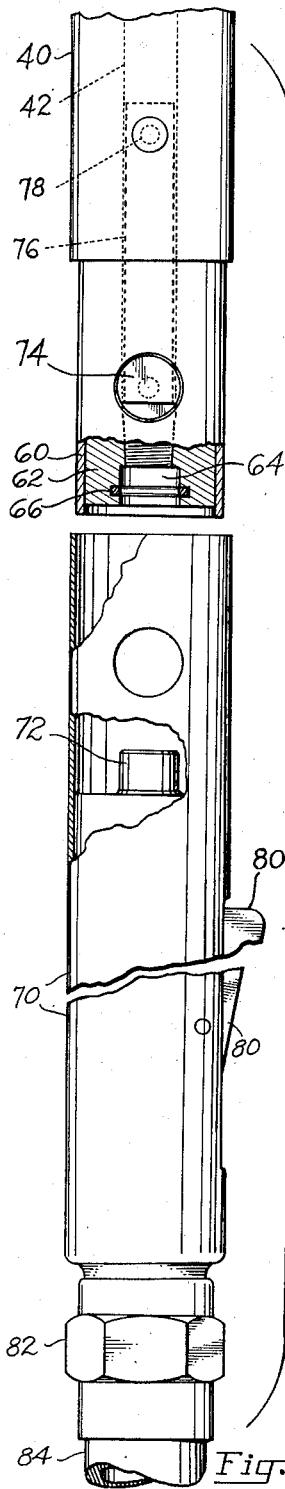
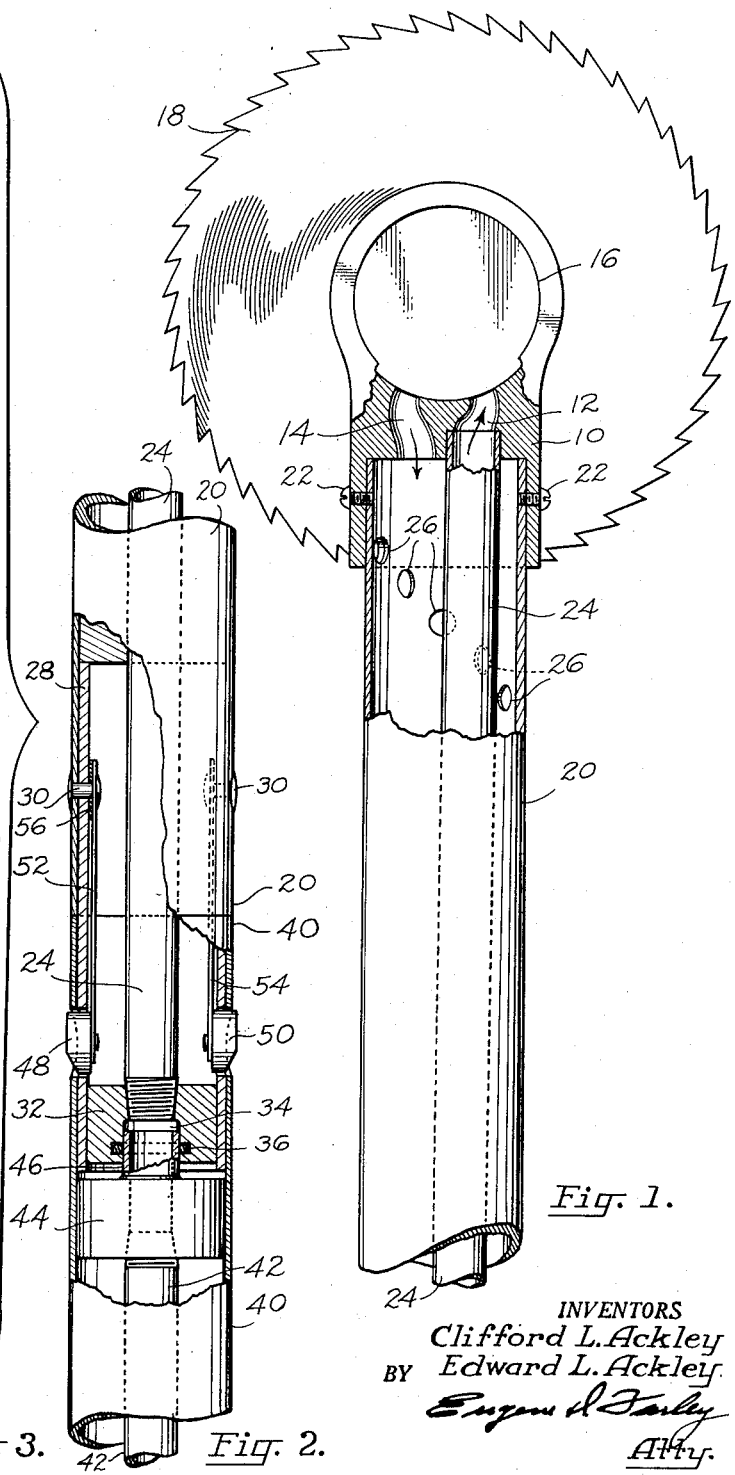
Fig. 1.
Fig. 2.
Fig. 3.
INVENTORS
Clifford L. Ackley
Edward L. Ackley
BY
Atty.

2,814,110
Patented Nov. 26, 1957

2,814,110

PRUNING SAW

Clifford L. Ackley and Edward L. Ackley, Portland, Oreg.

Application January 23, 1956, Serial No. 560,486

5 Claims. (Cl. 30—167)

This invention relates to pruning saws of the class which are power driven and used for pruning trees and heavy shrubbery.

Although various types of power pruning saws heretofore have been designed, these have not been satisfactory when applied to heavy pruning for one or more of the following reasons. They are not efficient in operation, particularly in that they are subject to stalling and damage when used for pruning large limbs. They are heavy and clumsy to manipulate particularly when used in conjunction with a long handle in order to reach branches at high elevations. They tend to be clogged by sawdust. They are not safe, particularly around high tension lines. Their repair is hazardous and difficult. Their operation is noisy.

Accordingly it is the general object of the present invention to provide a power pruning saw which overcomes the foregoing and other deficiencies and which is efficient in operation, lightweight, silent, safe, and easy to use and repair.

The manner in which the foregoing and other objects of this invention are accomplished will be apparent from the accompanying specification and claims considered together with the drawings, wherein:

Fig. 1 is a view in side elevation, partly in section, of the head of the herein described pruning saw;

Fig. 2 is a sectional view in elevation of a sectional handle which may be used in conjunction with the pruning saw of Fig. 1, illustrating the manner in which the sections may be releasably coupled together; and Fig. 3 is an exploded view of the sectional handle of Fig. 2 further illustrating the manner of coupling the sections together.

Generally stated, the pruning saw of this invention comprises a saw head, a saw blade, a fluid operated motor mounted on the saw head and having inlet and outlet air ports, and means for coupling the saw blade to the motor. A hollow handle containing a compressed air conduit is coupled to the head in such a manner that the conduit communicates with the inlet air port of the motor, and the bore of the handle communicates with the outlet air port thereof. The handle is perforated adjacent the saw blade so that the air exhausted from the motor outlet port will blow away the sawdust, preventing fouling of the working parts of the assembly. Means also are provided for assembling the handle in sections which are releasably locked together.

Considering the foregoing in greater detail and with particular reference to the drawings:

A saw head 10 provided with a recessed shank and with an inlet air channel 12 and an outlet air channel 14 supports a fluid operated motor, preferably a rotary motor 16. A saw blade 18, preferably of the rotary type, is coupled to the shaft of the motor.

The recess in saw head 10 extends substantially at right angles to the shaft of motor 16 and receives the upper section 20 of a sectional handle. The handle is hollow and dimensioned for a forced fit in the recess where it preferably is secured by suitable means, for example, by means of screws 22.

Extending longitudinally of the handle is a conduit 24 which is adapted to convey compressed air or other fluid under pressure to the motor. The upper end of this conduit communicates with channel 12 which in turn communicates with the inlet port of motor 16. The bore of handle section 20 communicates with channel 14, which in turn communicates with the outlet port of motor 16. Compressed air therefore can pass through conduit 24, channel 12, motor 16, and out through channel 14, into the bore of handle section 20. There it escapes through one or more spaced openings 26.

It is a particular feature of our pruning saw that openings 26 are placed adjacent the cutting edge of the saw blade 18. Accordingly as the exhaust air escapes through them, it blows the sawdust away from the saw and prevents fouling of its working parts. Also, since the saw often may be used with saw blade 18 faced downwardly, the air exhausting from ports 26 exerts a jet effect which tends to lift the assembly, thereby lightening it and facilitating its manipulation.

The herein described pruning saw is adapted particularly for use in pruning trees and accordingly is provided with a sectional handle, the sections of which may be locked together releasably to provide a handle of the required length. This operation may be accomplished rapidly without the use of tools while contemporaneously connecting the units of the fluid pressure line contained within the handle.

For this purpose the lower end of handle section 20 is provided with a segment of reduced diameter. In the illustrated form this segment comprises a sleeve 28 which is secured to the interior of the lower end of section 20 by any suitable means, for example by means of rivets 30.

The outer end of sleeve 28 is provided with a plug 32 having an axial opening centrally therethrough. The lower end of compressed air conduit 24 is threaded into the upper portion of this opening. The lower portion of the opening provides a recess 34 which is enlarged peripherally in its central portion to accommodate a sealing ring 36 of rubber or similar resilient material.

Like section 20, the companion section 40 of the handle is hollow and contains a section 42 of the fluid pressure line. The upper end of this handle section is dimensioned to slip over sleeve 28 and is provided with a bored block 44 into which fluid pressure line 42 is threaded. However, this line extends through the block to provide a projecting section 46 dimensioned to penetrate recess 34 in plug 32 of the upper handle section, where it contacts ring 36 in sealing engagement and communicates with upper fluid pressure line 24 to provide a continuous passageway for the fluid which operates the saw motor.

Means also are provided for releasably interlocking the handle sections 20, 40. In the illustrated form, such means comprise a pair of latches or dogs 48, 50. These are adapted to seat in registering openings through sleeve 28 and handle section 40. They are urged resiliently in an outward direction by springs 52, 54 which conveniently may be fastened to the sleeve-handle assembly by means of rivets 30, washers 56 being provided to space the springs apart from the inner wall of the sleeves.

Hence sleeve 28 may be inserted in the bore of handle section 40 whereupon the inclined guiding surfaces on latches 48, 50 will cause these members to slide easily until they are opposite the perforations in the sleeve and handle section. Thereupon they will be urged by springs 52, 54 outwardly into the openings, so that the sections will be held securely in place.

In this position the projecting end 46 of fluid conduit 42 will be seated in recess 34, thereby connecting this fluid conduit with the companion fluid conduit 24 in the upper handle section. However, when it is desired to separate the two handle sections, this may be done easily by depressing latch members 48, 50.

As is illustrated in Fig. 3, the lower end of handle section 40 may be constructed identically with the lower end of handle section 20. Accordingly it may be provided with a sleeve member 60, the end of which contains a drilled plug 62. The lower end of fluid conduit 42 may be threaded into the upper portion of this plug while the lower portion contains a recess 64 which is analogous to recess 34 of the upper section and which also may be enlarged peripherally to accommodate a rubber sealing ring 66.

As a consequence, as many handle sections may be assembled as are required to provide a handle assembly of sufficient length to reach the situs of the pruning operation. The bottom or outermost handle section, however, is constructed in such a manner as to be held by the operator and to provide valve means for controlling the flow of fluid to the motor.

Thus hollow handle section 70 is provided with a projecting stub conduit 72 which is proportioned to penetrate recess 64 where it engages sealing ring 66 in sealing engagement. This terminal handle section then may be releasably interlocked with the adjacent handle section 40 by means of latch members 74 which are adapted to penetrate openings through sleeve 60 and handle section 70 and which are mounted on springs 76. As described above, springs 76 are spaced apart from the inner wall of the sleeve in which they are contained and are affixed thereto by suitable means such as rivets 78.

Any suitable type of valve means may be provided for controlling the flow of fluid through handle section 70, and the handle sections attached thereto. In the illustrated form, the valve means is controlled by means of a lever 80 which is conveniently grasped by the operator as he uses the saw. The entire assembly then is coupled by means of coupling 82 to a flexible hose 84 which leads to an air compressor or other source of fluid under pressure.

Operation

In operation as many handle sections are locked together as are required to reach the branches to be pruned. To accomplish this result, sleeve 28 on upper handle section 20 is inserted in the upper end of handle section 40. The projecting section 46 of fluid pressure conduit 42 which extends along the interior of handle section 40 then penetrates recess 34 in plug 32 where a seal is provided by rubber ring 36. This connects conduits 24 and 42.

At the same time latch members 48, 50 urged by springs 52, 54 snap outwardly into the adjacent registering openings through sleeve 28 and handle section 40, thereby releasably locking the handle sections together. One or more handle sections may thus be coupled together, the terminal section 70 being provided with a valve controlled by lever 80 and coupled through flexible line 84 to a source of fluid under pressure.

Compressed air or other fluid under pressure thus passes through line 84, valve 80, projection 72, conduit 42, conduit 24, channel 12 in the saw head, fluid operated motor 16, exhaust channel 14, the inner bore of handle section 20, and out through perforations 26 in the latter.

The jet effect of the fluid escaping through these perforations lifts the saw and lightens it as it is used in a horizontal position. Also, the blast of fluid through the openings blows the sawdust away from the saw, avoiding fouling its working parts. Still further, a muffling effect is obtained so that the disagreeable siren sound which often accomplishes the use of an assembly of this sort is greatly reduced.

Having thus described our invention in preferred embodiments, we claim as new and desire to protect by Letters Patent:

1. A pruning saw comprising a saw head having air inlet and outlet channels therethrough, a saw blade, a pneumatic motor mounted on the saw head and having inlet and outlet air ports communicating respectively with the inlet and outlet channels through the saw head, means for coupling the saw blade to the motor, an elongated hollow handle having at least one air exhaust perforation transversely therethrough on one side of the handle adjacent the saw-blade, a compressed air conduit within the handle, and means for coupling the handle to the saw head with the compressed air conduit communicating with the air inlet channel thereof and the bore of the handle communicating with the air outlet channel thereof.

2. A pruning saw comprising a saw head, a circular saw blade, a rotary pneumatic motor mounted on the saw head and having inlet and outlet air ports, means for coupling the saw blade to the motor, an elongated hollow handle having at least one air exhaust opening transversely therethrough on one side of the handle adjacent the saw blade, an air conduit within the handle, and means for coupling the handle to the saw head with the air conduit communicating with the inlet port of the motor and the bore of the handle communicating with the outlet port thereof.

3. The pruning saw of claim 4 wherein the plane of the saw blade is arranged substantially parallel to the longitudinal axis of the handle and the exhaust opening through the handle is placed adjacent the periphery of the saw blade and directed thereagainst for blowing sawdust away from the same.

4. A pruning saw comprising a saw head having air inlet and outlet channels therethrough, a rotary saw blade, a rotary pneumatic motor mounted on the saw head and having inlet and outlet air ports communicating respectively with the inlet and outlet channels in the saw head, an elongated hollow handle having a plurality of spaced apart air exhaust openings transversely therethrough, a compressed air conduit within the handle, means for coupling the handle to the saw head with the compressed air conduit communicating with the inlet air channel of the saw head and the bore of the handle communicating with the outlet air channel therethrough, and means for coupling the saw blade to the motor for rotation in a plane substantially parallel to the longitudinal axis of the handle, the air exhaust openings in the handle being positioned adjacent the periphery of the saw blade and directed substantially normal to the plane of said saw blade.

5. A pruning saw comprising an elongated handle, a rotary pneumatic motor mounted on one end of the handle and having inlet and outlet air ports, a circular saw blade, means securing the saw blade to the motor for rotation in a plane substantially parallel to the longitudinal axis of the handle, an air conduit within the handle communicating with the inlet port of the motor, and at least one air exhaust opening in the handle, the inner end of the air exhaust opening communicating with the outlet air port of the motor and the outer end of the air exhaust opening being positioned adjacent the periphery of the saw blade and directed substantially normal to the plane of said saw blade.

References Cited in the file of this patent

UNITED STATES PATENTS

| | | |
|---|---|---|
| 1,382,350 | Gleason | June 21, 1921 |
| 1,520,330 | Chinn | Dec. 23, 1924 |
| 1,566,797 | Holtzman | Dec. 22, 1925 |
| 1,646,812 | Dovey et al. | Oct. 25, 1927 |
| 1,646,813 | Dovey et al. | Oct. 25, 1927 |
| 1,682,268 | Dovey et al. | Aug. 28, 1928 |
| 2,520,411 | Jenkins | Aug. 29, 1950 |
| 2,655,957 | Lagant | Oct. 20, 1953 |